(12) United States Patent
Bauer et al.

(10) Patent No.: US 11,117,236 B2
(45) Date of Patent: Sep. 14, 2021

(54) ROTARY INDEXING TABLE WITH POWER-OPTIMIZED DRIVE

(71) Applicant: WEISS GMBH, Buchen (DE)

(72) Inventors: Stefan Bauer, Limbach-Laudenberg (DE); Dominik Goisser, Buchen (DE); Thomas Andres, Buchen (DE)

(73) Assignee: WEISS GmbH

( * ) Notice: Subject to any disclaimer, the term of this patent is extended or adjusted under 35 U.S.C. 154(b) by 0 days.

(21) Appl. No.: 16/637,971

(22) PCT Filed: Jul. 17, 2018

(86) PCT No.: PCT/EP2018/069338
§ 371 (c)(1),
(2) Date: Feb. 10, 2020

(87) PCT Pub. No.: WO2019/029953
PCT Pub. Date: Feb. 14, 2019

(65) Prior Publication Data
US 2020/0230768 A1    Jul. 23, 2020

(30) Foreign Application Priority Data

Aug. 10, 2017   (DE) .......................... 102017118262.4

(51) Int. Cl.
*B23Q 16/02*   (2006.01)
(52) U.S. Cl.
CPC ...... *B23Q 16/025* (2013.01); *B23Q 2220/004* (2013.01); *F16C 2322/39* (2013.01)

(58) Field of Classification Search
CPC ...... B23Q 5/26; B23Q 16/022; B23Q 16/025; B23Q 16/06; B23Q 2220/004;
(Continued)

(56) References Cited

U.S. PATENT DOCUMENTS

| | | | | |
|---|---|---|---|---|
| 5,188,004 A | * | 2/1993 | Kitagawa | .................. B23Q 5/56 |
| | | | | 74/409 |
| 6,279,219 B1 | * | 8/2001 | Ohsawa | .................. B23P 19/04 |
| | | | | 29/407.01 |

(Continued)

FOREIGN PATENT DOCUMENTS

| | | |
|---|---|---|
| CN | 1608795 A | 4/2005 |
| DE | 150839 C | 3/1904 |

(Continued)

OTHER PUBLICATIONS

Machine translation of DE 102015224860 A1 obtained on May 21, 2020.*

(Continued)

*Primary Examiner* — Adam D Rogers
(74) *Attorney, Agent, or Firm* — Dickinson Wright PLLC

(57) ABSTRACT

Disclosed is a rotary indexing table (10) having an output flange (12) which is suitable for receiving a workpiece, mounted on a housing (14) of said rotary indexing table (10) for rotation about an axis of rotation (A) and drivingly connected to at least one drive element (24) which engages a driving groove (22) in a cylindrical cam (20) which can be (Continued)

driven by a motor, the cylindrical cam (20) being disposed asymmetrically to the axis of rotation (A) of the output flange (12).

11 Claims, 2 Drawing Sheets

(58) Field of Classification Search
CPC .. F16C 19/166; F16C 19/362; F16C 2322/39; F16H 57/12
See application file for complete search history.

(56) References Cited

U.S. PATENT DOCUMENTS

| | | | | |
|---|---|---|---|---|
| 6,862,786 B2* | 3/2005 | Kato | ........................ | B23Q 1/38 29/38 B |
| 7,395,743 B2* | 7/2008 | Kato | ........................ | B23Q 5/341 82/146 |
| 7,603,930 B2* | 10/2009 | Kato | ..................... | B23Q 16/025 74/813 R |
| 8,443,698 B2* | 5/2013 | Cafuta | ................... | B23Q 16/025 74/813 R |
| 10,646,974 B2* | 5/2020 | Chen | ..................... | B23Q 16/025 |
| 2005/0097985 A1 | 5/2005 | Kato | | |
| 2006/0013519 A1* | 1/2006 | Fukunaga | ............... | F16C 35/06 384/450 |

FOREIGN PATENT DOCUMENTS

| | | | | |
|---|---|---|---|---|
| DE | 202004006697 U1 | 3/2005 | | |
| DE | 102006061310 A1 * | 7/2008 | ........... | B23Q 16/025 |
| DE | 102008060569 A1 | 6/2010 | | |
| DE | 102010016682 U1 | 5/2011 | | |
| DE | 102013109307 A1 | 3/2015 | | |
| DE | 102013113722 A1 * | 6/2015 | ............. | F16H 1/166 |
| DE | 102015224860 A1 * | 3/2017 | ................ | B23Q 1/52 |
| DE | 102015224865 A1 * | 3/2017 | ................ | B23Q 1/52 |
| EP | 2255923 A1 | 12/2010 | | |
| FR | 2248745 A5 | 5/1975 | | |
| JP | 01252342 A * | 10/1989 | ........... | B23Q 16/025 |

OTHER PUBLICATIONS

Official Communication from the German Patent Office for related German Application No. 102017118262.4; dated May 9, 2018; 2 pages.
Official Communication from the European Patent Office for related International Application No. PCT/EP2018/069338; dated Jan. 4, 2019; 5 pages.
First Chinese Office Action, along with an English translation, dated Jun. 2, 2021 for Chinese Application No. 201880049960.3, 7 pages.

* cited by examiner

ROTARY INDEXING TABLE WITH POWER-OPTIMIZED DRIVE

CROSS-REFERENCES TO RELATED APPLICATIONS

This patent application is a 371 of International Application No. PCT/EP2018/069338, filed Jul. 17, 2018 which claims the priority of German Application No. 102017118262.4, filed Aug. 10, 2017, each of which are incorporated herein by reference in their entirety.

BACKGROUND OF THE INVENTION

1. Field of the Invention

The present invention relates to a rotary indexing table and in particular to a rotary indexing table that is optimized with respect to its required drive power.

2. Related Art

Rotary indexing tables can be used to rotationally move a workpiece to be machined from a first position of rest into a second position of rest. Such rotary indexing tables are generally known in different embodiments from the prior art and typically have an output flange that is suitable for receiving a workpiece and that is rotatably supported about an axis of rotation at a housing of the rotary indexing table and is drive effectively connected to at least one entrainer that engages into a drive groove of a barrel cam that is drivable by a motor of the rotary indexing table. The output flange thus so-to-say represents a kind of turntable.

One demand that is made on such rotary indexing tables is that the workpiece transport should take place in as energy saving a manner as possible.

SUMMARY OF THE INVENTION

It is therefore the underlying object of the invention to provide a rotary indexing table that is optimized with respect to its required drive power and can be operated in as energy saving a manner as possible.

This object is satisfied in accordance with a first aspect by a rotary indexing table having a barrel cam and in particular the drive effective section (DES; FIGS. 1b, 2 and 3) of the barrel cam, that is defined by the axial extent of the drive groove, is arranged asymmetrically to the axis of rotation of the output flange. It is possible in this manner to optimize and in particular to maximize the effective lever arm length via which the output flange is driven by the barrel cam. The average effective lever arm length during the phase in which the entrainers are conveyed by the drive groove as a result of the rotation of the barrel cam is in particular maximized in comparison with a rotary indexing table having a barrel cam of the same length, but arranged symmetrically. The required drive power and thus the internal friction between the drive groove and the entrainer are thus reduced independently of the respective torque due to the increase of the effective lever arm length in the engagement region so that less torque is required for the drive of the barrel cam.

Preferred embodiments of the invention will now be looked at in the following. Further embodiments can also result from the dependent claims, from the description of the Figures and from the drawings.

Provision can thus be made in accordance with an embodiment that the drive effective section of the barrel cam is offset with respect to an arrangement that is symmetrical with respect to the axis of rotation of the output flange by an amount that approximately corresponds to 5 to 30%, in particular 7 to 25%, of the length of the drive effective section of the barrel cam. Said offset amount can preferably correspond to approximately 10 to 20%, and in particular approximately 15%, of the length of the drive effective section of the barrel cam. The preferred size of the offset amount here depends on the dimensioning of the output flange and of the barrel cam. The offset amount in particular depends on the radius of the barrel cam, on the pitch of the drive groove, and on the number of entrainers and their radial spacing from the axis of rotation of the output flange.

To be able to further reduce the inner friction of the drive of the rotary indexing table in favor of a reduction of the required drive power, in accordance with a further aspect of the invention the output flange can be supported at the housing of the rotary indexing table by means of a ball bearing supported slewing ring. The support of the output flange by means of a ball bearing supported slewing ring at the housing of the rotary indexing table can here be used additionally or alternatively to the asymmetrical arrangement of the barrel cam in accordance with the first aspect of the invention.

The ball bearing supported slewing ring can here preferably be designed as an eight point bearing or as a cross roller bearing. In contrast to this, the support of the drive flange in conventional rotary indexing tables takes place via combinations of axially and radially effective bearings. Since the bearing friction of ball bearing supported slewing rings is as a rule smaller than the bearing friction of combined axial and radial bearings, the required drive power can be further reduced by the support of the output flange by means of a ball bearing supported slewing ring at the housing of the rotary indexing table.

BRIEF DESCRIPTION OF THE DRAWINGS

The invention will now be explained in the following purely by way of example with reference to the drawings, in which.

DETAILED DESCRIPTION OF THE INVENTION

Figure 1A:
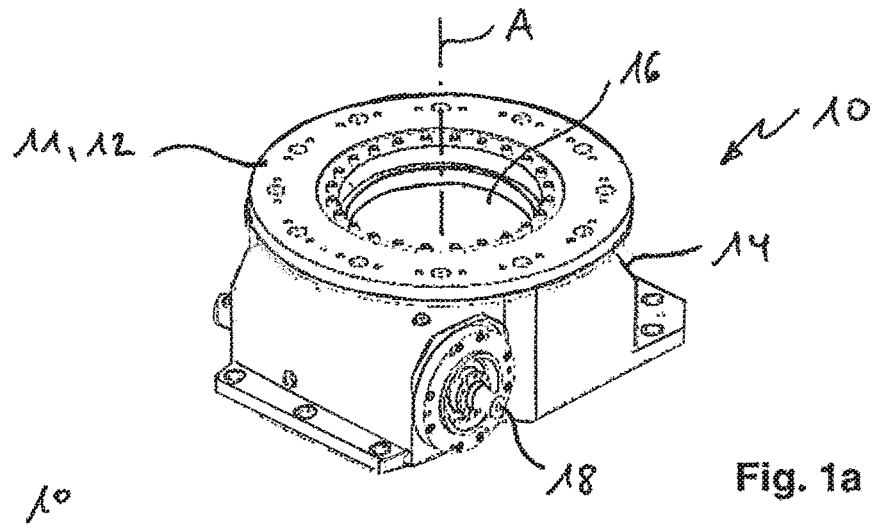
FIGS. 1a-1c show an embodiment of a rotary indexing table in accordance with the invention in different views.

FIG. 1a perspectively shows a rotary indexing table 10 in accordance with the invention that in the embodiment specifically shown here has an annular output flange 12 formed as a turntable 11 to receive workpieces to be machined (not shown). The output flange 12 or the turntable 11 is here supported rotatably about an axis of rotation A at a housing 14 of the rotary indexing table 10 so that the output flange 12 can be rotationally moved from one position of rest into a second position of rest. In the embodiment shown here, the output flange 12 is annular and surrounds a central opening 16 in which, for example, one or more machining tools (not shown) can be located to machine workpieces located on the turntable 11.

The rotary indexing table 10 or its output flange 12 is driven by a motor, not shown here, whose shaft can be coupled to a drive shaft 18 of the rotary indexing table 10. The drive shaft 18 here drives a barrel cam 20 that is rotatably supported in the housing 14 of the rotary indexing table 10. For this purpose, a spirally peripheral drive groove 22 is formed in the barrel cam 20 and the entrainers 24 that are drive effectively connected to the drive flange 12 at its side that is lower—in the position of use—engage into said drive groove 22. The entrainers 24 are here designed as roller pins having cam rollers 26. The entrainers 24 engaging into the drive groove 22 are thus dragged along by the rotational movement of the barrel cam 20, whereby the output flange 12 is driven to make a rotational movement in the desired manner.

Figure 1B:
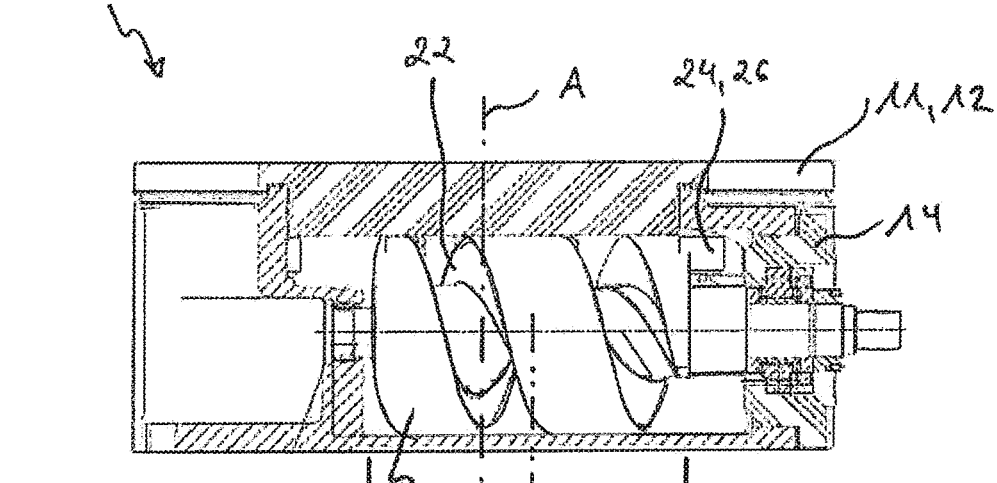
Figure 1C:
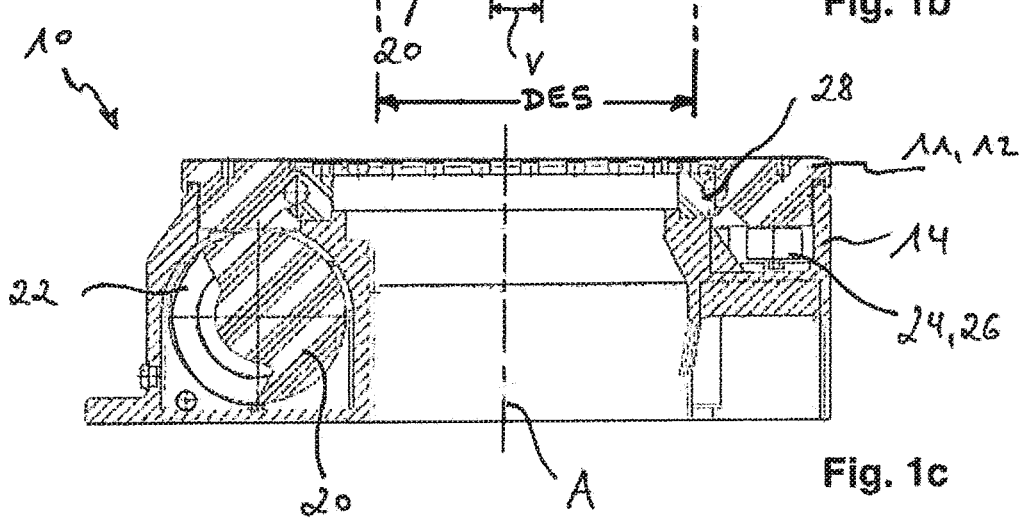

As can be seen from FIG. 1c, the output flange 12 is supported in accordance with the invention by means of a ball bearing supported slewing ring 28 designed as a four point bearing at the housing 14 of the rotary indexing table 10, whereby the bearing friction can be minimized in the desired manner in favor of the reduction of the required drive power for the rotary indexing table 10.

As can be seen from FIG. 1a and in particular from FIG. 1b, the barrel cam 20 and in particular its drive effective section, that is defined by the axial extent of the drive groove 22, is arranged asymmetrically to the axis of rotation A of the output flange 12 in favor of the optimization of the effective lever arm length via which the output flange 12 is driven by the barrel cam 20. In the embodiment shown here, the drive effective section of the barrel cam 20 is here offset with respect to an arrangement that is symmetrical with respect to the axis of rotation A of the output flange 12 by an offset amount V that approximately corresponds to 15% of the length of the drive effective section of the barrel cam 20. The specific offset amount V, however, depends on the geometry of the respective rotary indexing table and is preferably in the region between 10 and 20% of the length of the drive effective section of the barrel cam 20.

Figure 2:
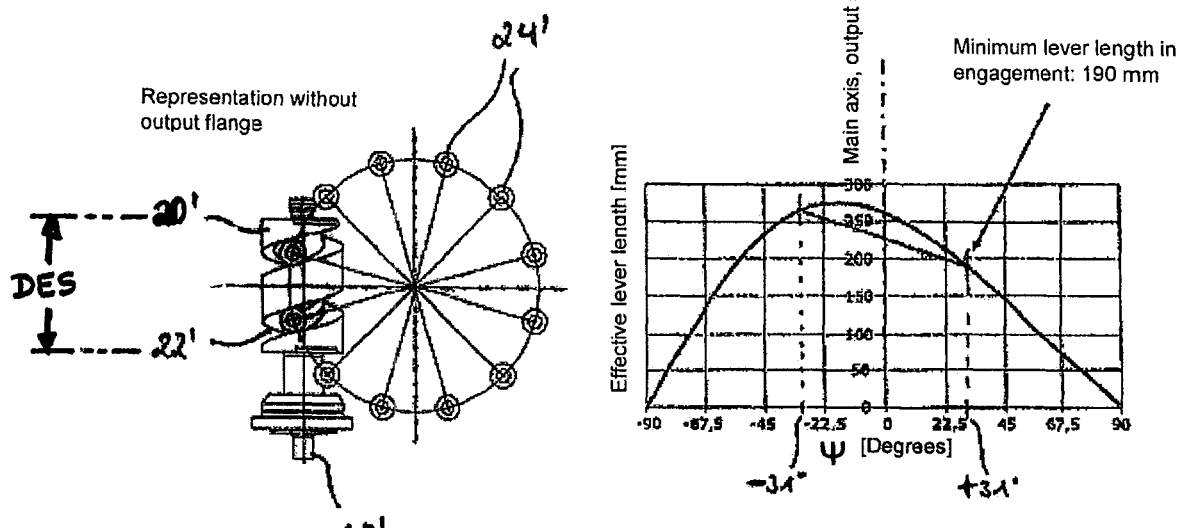
FIG. 2 illustrates the effective lever arm relationships of a conventional rotary indexing table having a symmetrically arranged barrel cam.

The effect of the asymmetrical arrangement of the barrel cam 20 in accordance with the invention on the effective lever arm length will be explained in the following with reference to FIGS. 2 and 3. FIG. 2 here explains the effective lever arm length in a conventional rotary indexing table 10' having a symmetrically arranged barrel cam 20' as is schematically illustrated in the left hand representation of FIG. 2. The right hand representation of FIG. 2 here illustrates the effective lever arm length in dependence on the angle of rotation of the output flange, that is not shown here. As can be seen from this representation, the individual entrainers 24' enter into the drive groove 22' of the barrel cam 20' at an angle of rotation $\psi$ of approximately −31°, whereupon they are dragged along by the drive groove 22' as a result of the rotational movement of the barrel cam 20' and exit the same again at an angle $\psi$ of approximately 31°. The effective lever arm length here increases during this engagement region from a starting value of approximately 270 mm to a maximum value of approximately 275 mm before the effective lever arm length subsequently continuously reduces down to a minimal lever arm length of approximately 190 mm at that point in time at which the entrainers 24' leave the drive groove 22' again. The effective lever arm length can be determined here in that the radial spacing of the respective entrainer 24' from the axis of rotation A at every angle of rotation $\psi$ of the output flange is split into two vectors which are perpendicular to one another and of which the one vector is perpendicular on the border of the drive groove 22'. The other vector then represents the effective lever arm length.

Figure 3:
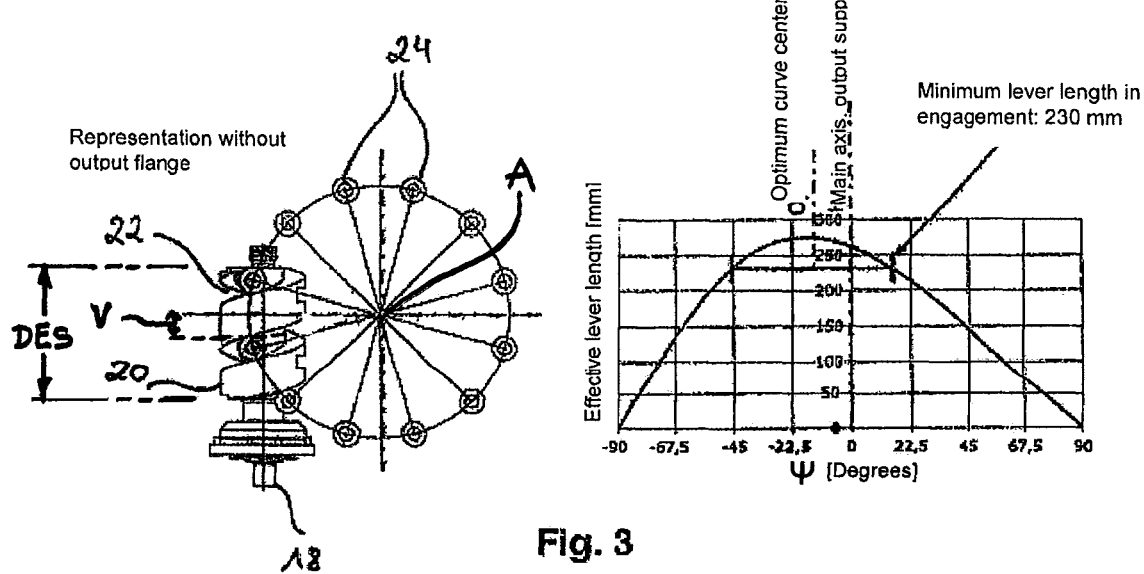
FIG. 3 illustrates the effective lever arm relationships of a rotary indexing table in accordance with the invention having an asymmetrically arranged barrel cam.

If corresponding considerations are made for a rotary indexing table 10 having an asymmetrically arranged barrel cam, the relationships result such as are shown with reference to FIG. 3. As can here be seen from the right hand diagram of FIG. 3, the entrainers 24 already enter into the drive groove 22 at an angle of rotation $\psi$ of approximately −45° due to the asymmetrical arrangement of the barrel cam 20, with a lever arm length of 230 mm resulting. The effective lever arm length here also increases up to a value of approximately 275 mm, with this maximum effective lever arm length being adopted at an angle $\psi$ of approximately −14° from where the effective lever arm length continuously reduces down to a minimal value of 230 mm at an angle $\psi$ of approximately +15°.

In contrast to the symmetrical arrangement of the barrel cam in accordance with FIG. 2, the minimal effective lever arm length is thus 40 mm larger (230 mm with the asymmetrically arranged barrel cam with respect to 190 mm with a symmetrically arranged barrel cam), whereby the maximum strain on both the entrainers 24 and the barrel cam 20 can be reduced. Due to the larger minimal effective lever arm length, less torque is furthermore also required for the drive of the output flange 12, whereby the drive power required for the drive of the rotary indexing table 10 can be minimized.

The invention claimed is:

1. A rotary indexing table having an output flange for receiving a workpiece, the output flange being supported rotatably about an axis of rotation at a housing of the rotary indexing table, and the output flange being drivably connected to at least one entrainer, the at least one entrainer engaging into a drive groove of a barrel cam that is drivable, wherein a drive effective section of the barrel cam, extending along a rotational axis of the barrel cam over an axial extent of the drive groove from a location where the at least one entrainer enters the drive groove to a location where the at least one entrainer exits the drive groove, is arranged asymmetrically in axially offset relation along the rotational axis relative to the axis of rotation of the output flange.

2. The rotary indexing table in accordance with claim 1, wherein a length of the drive effective section of the barrel cam is defined by an axial length section of the drive groove extending along the rotational axis of the barrel cam.

3. The rotary indexing table in accordance with claim 2, wherein the drive effective section of the barrel cam is axially offset along the rotational axis of the barrel cam with respect to the axis of rotation of the output flange by approximately 5 to 30% of the length of the drive effective section of the barrel cam.

4. The rotary indexing table in accordance with claim 3, wherein the drive effective section of the barrel cam is axially offset along the rotational axis of the barrel cam with respect to the axis of rotation of the output flange by approximately 7 to 25% of the length of the drive effective section of the barrel cam.

5. The rotary indexing table in accordance with claim 4, wherein the drive effective section of the barrel cam is axially offset along the rotational axis of the barrel cam with respect to the axis of rotation of the output flange by approximately 10 to 20% of the length of the drive effective section of the barrel cam.

6. The rotary indexing table in accordance with claim 5, wherein the drive effective section of the barrel cam is axially offset along the rotational axis of the barrel cam with respect to the axis of rotation of the output flange by approximately 15% of the length of the drive effective section of the barrel cam.

7. The rotary indexing table in accordance with claim 1, wherein the output flange is supported at the housing of the rotary indexing table by means of a ball bearing supported stewing ring.

8. The rotary indexing table in accordance with claim 7, wherein the ball bearing supported stewing ring is designed as a four-point bearing.

9. The rotary indexing table in accordance with claim 1, wherein the output flange is supported at the housing of the rotary indexing table by means of a bearing supported stewing ring and the bearing supported stewing ring is designed as a cross roller bearing.

10. The rotary indexing table in accordance with claim 1, wherein the at least one entrainer enters the drive groove at a first angle of rotation and exits the drive groove at a second angle of rotation, wherein the first angle of rotation is different from the second angle of rotation.

11. The rotary indexing table in accordance with claim 10, wherein the first angle of rotation has a greater absolute value than the second angle of rotation.

\* \* \* \* \*